United States Patent [19]

Deerfield

[11] 3,781,814

[45] Dec. 25, 1973

[54] METHOD AND APPARATUS FOR APPLYING SOURCE LANGUAGE STATEMENTS TO A DIGITAL COMPUTER

[75] Inventor: Alan J. Deerfield, Newtonville, Mass.

[73] Assignee: Raytheon Company, Lexington, Mass.

[22] Filed: Oct. 7, 1971

[21] Appl. No.: 187,242

[52] U.S. Cl. .......... 340/172.5
[51] Int. Cl. .......... G06f 9/06
[58] Field of Search .......... 340/172.5

[56] References Cited

UNITED STATES PATENTS

| | | | |
|---|---|---|---|
| 3,611,306 | 10/1971 | Reigel et al. | 340/172.5 |
| 3,566,364 | 2/1971 | Hauck | 340/172.5 |
| 3,573,854 | 4/1971 | Watson | 340/172.5 |
| 3,551,895 | 12/1970 | Driscoll, Jr. | 340/172.5 |
| 3,570,006 | 3/1971 | Hoff et al. | 340/172.5 |
| 3,156,897 | 11/1964 | Bahnsen et al. | 340/172.5 |

*Primary Examiner*—Gareth D. Shaw
*Attorney*—Philip J. McFarland et al.

[57] ABSTRACT

A method of operating a general purpose computer which uses instruction words, each containing, in addition to an operation code and an operand address code, an operation sequence code and an improved processor adapted to the contemplated method is shown. The operation sequence code in each instruction word is read out of memory as a program counter is sequenced so that the processor may be caused to defer the operation called for by the instruction word until such operation may properly be executed. In addition, the processor may be controlled so that deferral may be effected whenever the hierarchal precedence of an operation to be performed dictates that the next following operation in a sequence be performed first.

2 Claims, 4 Drawing Figures

PATENTED DEC 25 1973 3,781,814

SHEET 1 OF 4

METHOD AND APPARATUS FOR APPLYING SOURCE LANGUAGE STATEMENTS TO A DIGITAL COMPUTER

The invention herein described was made in the course of or under a contract or subcontract thereunder, with the Department of Defense.

BACKGROUND OF THE INVENTION

This invention pertains generally to digital computers and particularly to a method and apparatus for programming a general purpose computer.

It is necessary, in the design and operation of a general purpose digital computer, to provide apparatus and method for converting, or translating, operation instructions and operand addresses from a user's language (sometimes referred to as a "source" or a "program" language) to a "machine" language. Such conversion is required to allow the user to express any given problem in understandable and logical instructions and then to permit the computer to execute such instructions in the order in which the calculating portion of the cumputer is designed to execute instructions. The process of converting instructions in a source language to "machine language" instructions for controlling the operation of a general purpose computer normally entails the use of relatively complex translation means, as software compilers. As is known, even with the best and most efficient compilers, the resultant set of machine language instructions is hardly ever the optimum: As a matter of fact, such instructions are inherently inefficient, requiring a larger memory in the computer than is necessary in the actual solution of any given problem.

As an additional complication, because the user defines, in a source language, a problem to be solved in terms of the logical and arithmetic instructions required for solution, it is difficult to check the correctness with which such instructions are translated in machine language. The reason for such difficulty is that the results of translation are presented in the unfamiliar symbology of machine language. The problem is all the more acute because, except in the simplest situations, the syntax of the source language instructions differs from the syntax of corresponding instructions in machine language. It follows, therefore, that, even when the source language statements are correct, any checking for accuracy of the translation to machine language is time consuming and difficult.

Many attempts have been made to develop a Higher Order Language (HOL) computer which may be designed and operated so that the translation of statements from a source language to a machine language is as simple as possible. The usefulness of such higher order language computers has, however, been limited to specific classes of problems because the syntax of known machine languages does not include all of the fundamental characteristics of source languages. That is, known machine languages have instruction words, each one of which includes an operation code (which controls the operation to be performed by the computer) and an address code (which defines the location in a memory of the digital quantities on which an operation is to be performed). There is no provision for syntax in an instruction word of such type. That is, there may be no notation of the precedence with which the various operation codes are to be executed. To put it another way, the syntax of known machine languages does not include coded signals corresponding to punctuation marks in a source language. The compilation, or translation, process to convert a given source language program to a machine language program must be carried out in such a manner as to eliminate notations of precedence among the various operation and address codes. In order to accomplish the required elimination of notations of precedence the compiler must, in almost all cases, be adapted to partially solve any problem presented to the computer. Such a requirement, in turn, makes it mandatory that, in addition to instructions to execute a program, many ancillary instructions are needed to process and store partial results and to introduce them at the proper time during the operational cycle of the computer. The importance of the number of such ancillary instructions in known general purpose digital computers may be grasped when one considers that, on the average, about one-half of the instructions in machine language are ancillary instructions.

In one advanced type of general purpose computer, the concept has been followed to eliminate the necessity of notations of the precedence with which operation codes are to be executed in the solution of algebraic problems. Thus, instruction words in a program to solve an algebraic problem are converted in a compiler to instruction words "Polish notation," i.e. all parentheses are eliminated. In order to convert instruction words in a source language to a statement in Polish notation, it is necessary to rearrange the operand and operation codes in the instruction words (using a compiler) so that the operand codes precede the operation codes. Polish notation allows compilation to be speeded up, by at least an order of magnitude, but is not well adapted to use when Boolean or logical expressions are to be processed.

SUMMARY OF THE INVENTION

With the foregoing background in mind, it is a primary object of this invention to provide, in a general purpose digital computer using instruction words which have an operation and an operand address field, improved method and apparatus to modify the syntax of such machine language, the contemplated modification being effected by adding an operation sequence field in each instruction word so that the syntax of the machine language to which the computer is responsive may be varied as desired.

Another object of this invention is to provide, in a general purpose digital computer, method and apparatus for reducing the time required to program and operate such computer, the contemplated reduction being effected by modifying the machine language of the computer to make the syntax of such language correspond to the syntax of source language and providing means whereby the operation of the computer is controlled in an orderly manner in accordance with such modified syntax.

A still further object of this invention is to provide, in a general purpose digital computer, improved method and apparatus to reduce the complexity of any compiler used therewith.

Still another object of this invention is to provide, in a general purpose digital computer, improved method and apparatus which permits checking of the correctness of the statements in source language as such statements are being executed in the computer.

A further object of this invention is to provide, in a general purpose digital computer, method and apparatus for reducing the number of ancillary instructions in machine language required to execute a given set of instructions in a source language.

The foregoing and other objects of this invention are attained generally by providing, in each instruction word in a program for controlling operation of a general purpose digital computer, a field containing an "operation sequence" code which, in combination with a conventional operation code and operand address code in respective fields in such instruction word, indicates to such computer that the operation designated by the operation code is: (a) to be executed immediately; or (b) is to be deferred until additional operations have been completed. The general purpose digital computer contains, in addition to a conventional processor, a so-called sequence memory and control circuits therefor, such control circuits being responsive to the operation sequence code in each instruction word to: (a) cause the processor to execute the routine called for by the operation code; (b) to store the operation code and the then existing partial computation of the processor in the sequence memory; or (c) read out of the sequence memory the last stored operation code and partial computation and execute the routine called for by the retrieved operation code, using the retrieved partial computation and the then existing partial computation as the variables for the processor.

Thus, the method contemplated by the invention generally comprises making the syntax of the machine language of a general purpose digital computer correspond to the syntax of a source language so that, as each instruction word in the latter language is introduced to the computer, the processing routine called for by the operational code in each successive instruction word is either executed immediately or deferred until a point is reached in the performance of the program by tbe computer that all information required to perform the deferred operation is available. The apparatus contemplated by this invention includes a general purpose digital computer having means for performing the operation required by the operation code in each instruction word if the information to perform such operation is in the processor of such computer or for deferring such operation until the processor of a digital computer may properly execute such instructions, meanwhile processing other instruction words. Both the method and apparatus contemplate that a compiler need not be employed to rearrange the instruction words in a program to permit translation from a source language to the machine language used by the computer.

BRIEF DESCRIPTION OF THE DRAWINGS

For a more complete understanding of the principles of this invention reference is now made to the following description of a preferred embodiment illustrating both the contemplated method and apparatus described in connection with the accompanying drawings in which.

DESCRIPTION OF THE PREFERRED EMBODIMENTS

Figure 1:
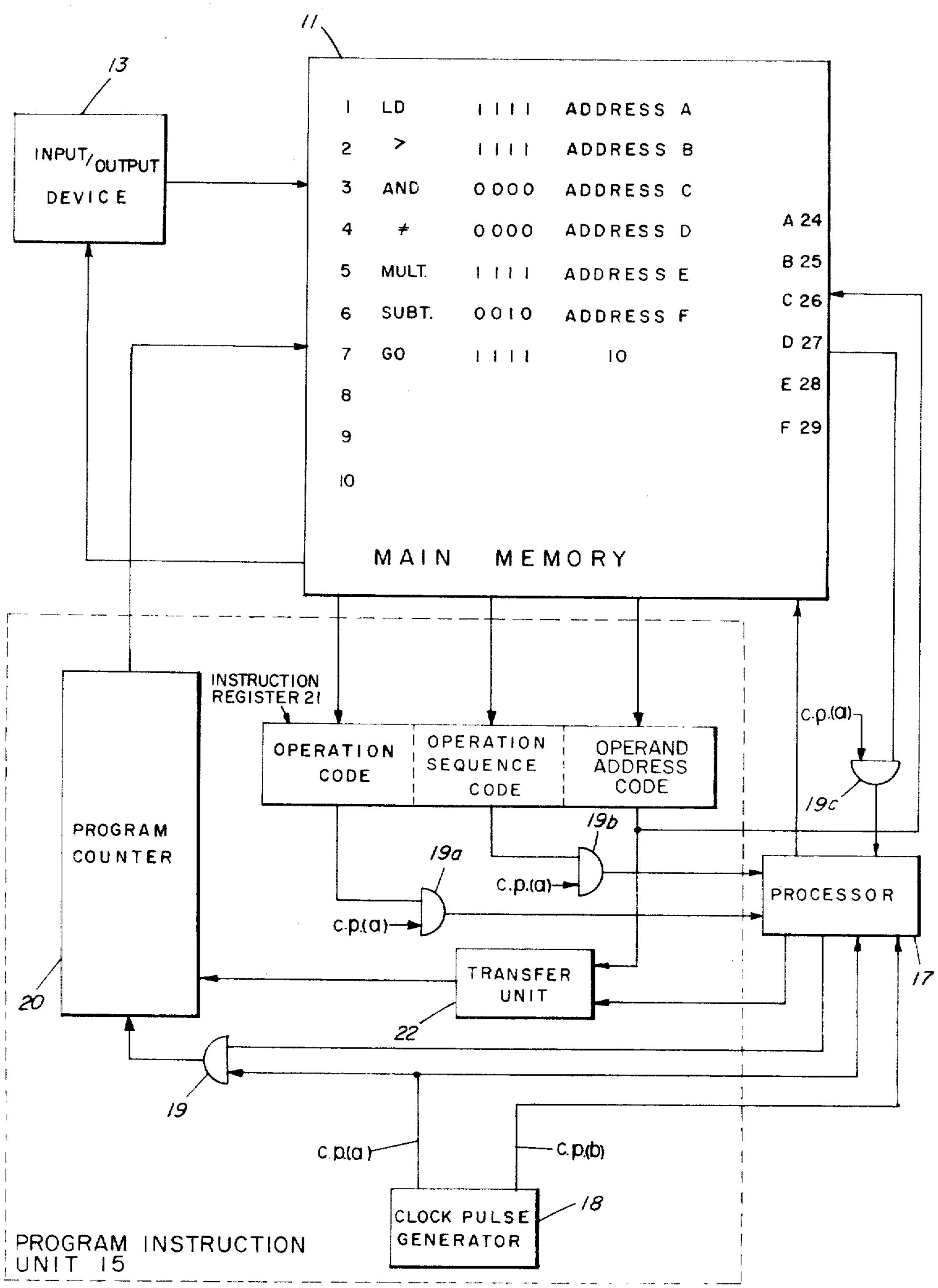
FIG. 1 is a block diagram greatly simplified illustrating the organization of a general purpose digital computer in which operation sequence instructions are given equal weight with operation and operand address instructions according to the contemplated method.
Figure 2:
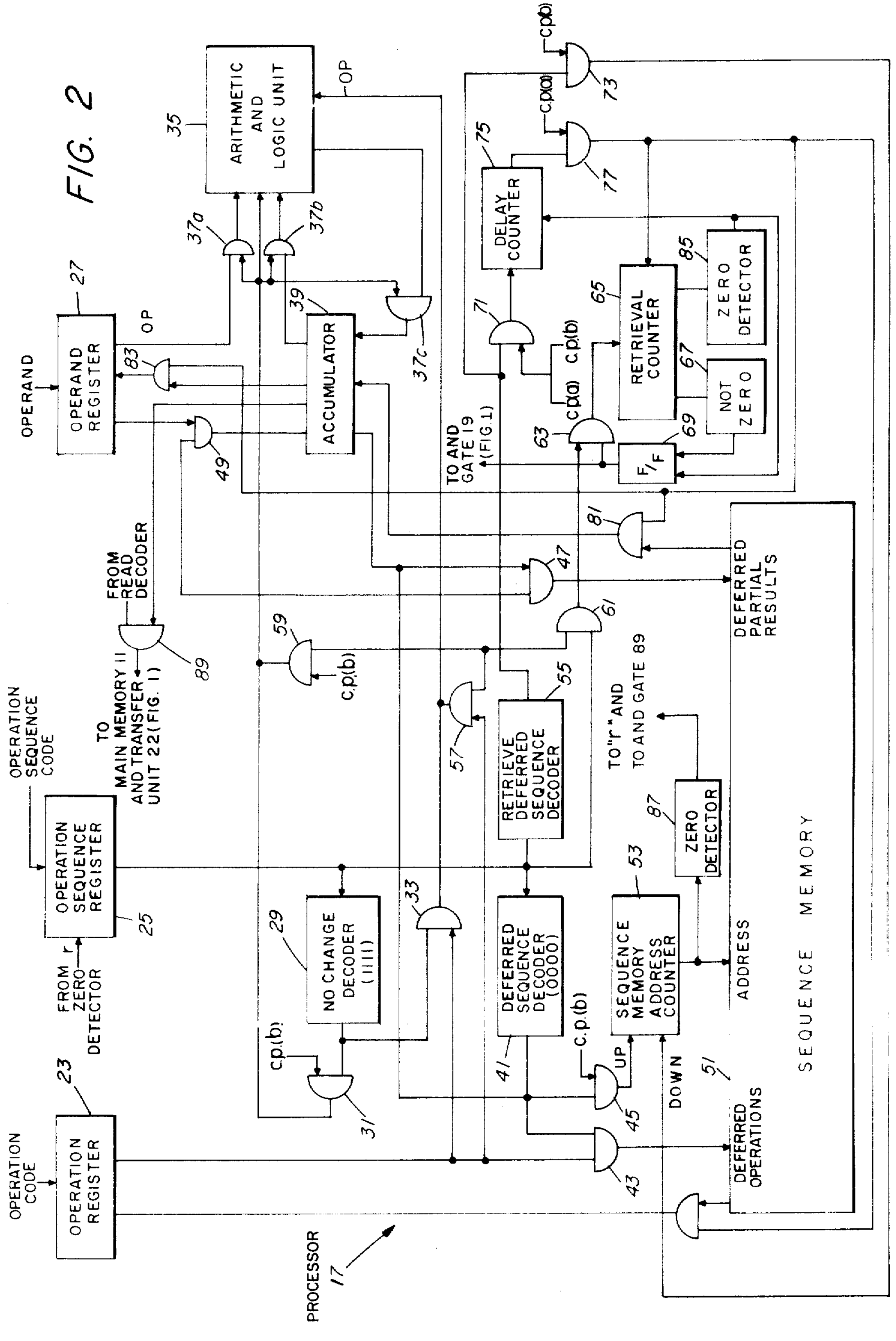
FIG. 2 is a block diagram of a processor for use in the computer illustrated in FIG. 1, showing in particular the manner in which such a processor may be made to be responsive to operation sequence codes following a "left to right" precedence notation.

Before referring to FIGS. 1 and 2, it should be noted that the contemplated computer is adapted to process arithmetic and logic statements. For this reason it has been chosen to illustrate the invention by showing the manner in which a sequence containing both arithmetic and logic statements may be programmed and processed. The specific sequence is:

IF A > B AND (C ≠ (DE − F)) GO TO M, ELSE CONTINUE PROGRAM

Referring now to FIG. 1 it may be seen that the organization of a general purpose computer for processing the just mentioned sequence according to the invention is substantially the same as the organization of a conventional computer for processing either arithmetic or logic statements. Here, however, the sequence is first analyzed, with left to right precedence, to derive individual program instruction words according to the invention. Thus, each one of the derived program instruction words contains an operation code field, an operation sequence code field and an operand address code field. It will be recognized that the operation sequence field has no counterpart in conventional program instruction words. Upon analyzing and forming the program instruction words for the given sequence, the following program is developed for the conditional part of the sequence.

| Program Word Number | Operation Code Field | Operation Sequence Field Code | Operand Code Address |
|---|---|---|---|
| 1 | IF (meaning load) | 1111 | A |
| 2 | > | 1111 | B |
| 3 | AND | 0000 | C |
| 4 | ≠ | 0000 | D |
| 5 | MULT | 1111 | E |
| 6 | SUBTR | 0010 | F |

Obviously, the operation codes and operand address codes would be expressed in digital forms corresponding to the form in which the operation sequence codes are expressed. Because, however, such expressions are well known in the art and are not essential to an understanding of the invention, only the digital forms of the operation sequence codes are shown.

The operation sequence codes here have the meanings shown in Table 1.

| Source Language Character | Operation Sequence Code | Meaning |
|---|---|---|
| NONE | 1111 | Execute operation called for |
| ( | 0000 | Defer execution of operation called for; store present operation and partial result |
| )) | 0010 | Execute present operation; and then; Inhibit program counter; Retrieve last stored operation and partial result and execute; Retrieve second last stored operation and partial result and execute; Enable continued operation of |

program counter

It is noted in passing that the code 0010 represents the closing of two parentheses and that, consequently, two deferred operations are sequentially retrieved and executed as required to process the exemplary sequence. A different number of closings required (obviously to a maximum of 14 with a four bit code) to process a different sequence would call for a change from the code 0010 with a corresponding change in the number of retrieved operations. A moment's thought will make it clear, however, that a "left to right" precedence requires that the last deferred operation be the first retrieved.

With the foregoing in mind it may be seen that the program instruction words are stored at consecutive addresses in a main memory 11 in a conventional manner when an input/output device 13 is actuated to program the computer. Each operand address, of course, indicates the memory address of an operand in the main memory 11. The stored program instruction words are sequentially read out of the main memory 11 in accordance with operation of a program instruction unit 15 and passed to processor 17. The results of the processing in the processor 17 are returned to a predetermined address in the main memory 11 from which such results may be read out of that address and passed to the input/output device 13.

As noted hereinbefore, each instruction word in each instruction address in the main memory 11 is divided into three fields: An operation field (as indicated in the left hand portion of each instruction word in the main memory 11); an operation sequence field (as indicated by the four digit code in the center of each instruction word); and an operand address field (as indicated by the right hand portion of each instruction word).

As will become clear in connection with the description of FIG. 2, the processor 17 responds to the code in the operation sequence field to rearrange, whenever necessary, the order in which the operation called for in the program instruction words is executed. That is, the processor 17 is controlled in such a manner that it executes any given operation at the earliest possible moment after the necessary information has been either presented to it or derived by it. In other words, the processor 17 here is used to carry out the "translation" function of a conventional compiler. It is emphasized, however, that there is no need here — as a matter of fact it is undesirable — for the complete program to be run before the "translation" process begins. It follows, then, that the execution time of any program by the contemplated computer is inherently shorter than the execution time of the same program in a conventional computer.

The program instruction unit 15 here includes a conventional clock pulse generator for producing interlaced clock pulses, referred to as c.p.(a), c.p.(b) to synchronize transfer of instructions and execution thereof by the various elements of the computer. The former clock pulses, on passing through an AND gate 19 (whose function will be explained hereinafter), actuate a program counter 20 to select successive instruction words from the main memory 11 and pass such word to an instruction register 21. The operation code and the operation sequence code in each instruction word are passed to the processor 17, through AND gates **19*a*, 19*b* as shown. The operand address code in the instruction register 21 selects a particular operand from the main memory 11. Such selected operand is passed, through AND gate 19*c*, to the processor 17. To complete the program instruction unit 15, a transfer unit 22 is connected between the processor 17 and the program counter 20. The transfer unit 22 (which will be described in more detail hereinafter) serves to force a change in the count of the program counter 20 whenever the conditions required to be true by the sequence are in fact true. Such a forced change here is the instruction "go to" which is entered in the main memory 11 at address 7**.

Referring now to FIG. 2 it may be seen that the input section of the processor 15 includes an operation register 23 and an operation sequence register 25 along with an operand register 27. Each one of these registers is set, respectively, by the operation and operation sequence code present in the instruction register 21 (FIG. 1) and the operand at the main memory address corresponding to the operand address in the instruction register 21. Assuming the first c.p.(a) to have caused the program counter 20 to have addressed instruction 1 in the main memory 11, operation register 23 contains a coded signal meaning "load"; operation sequence register 25 contains the code signal "1111" and operand register 27 contains "A". A "no change" decoder 29 (which may consist of a conventional decoding matrix to produce a "one" in response to a "1111" code in the operation sequence register 25) then enables AND gates 31, 33. The operation code in the operation register, therefore, is passed to an arithmetic and logic unit 35 to prepare that unit to load "A." The arithmetic and logic unit 35, here shown in block form, may take any known configuration. Thus, there may be any number and kinds of arithmetic units, as adders, multipliers and so on, or logic circuits, as comparators, in the arithmetic and logic unit 35. The operation code from the operation register 23 then serves to control a conventional switching matrix (not shown) to make the proper connections between the arithmetic and logic unit 35 and the operand register 27 and an accumulator 37. The next following clock pulse, here c.p.(b), then is passed through AND gate 31 to enable AND gates **37*a*, 37*b*, 37*c* and to cause the arithmetic and logic unit to execute the operation. That is, the "A" in the operand register 27 is transferred, through the arithmetic and logic unit 35, to the accumulator 39. The latter element is conventional, containing an arithmetic portion and a logic portion. The latter conveniently may be a reserved stage which may be set to either a "ONE" (meaning TRUE) or to a "ZERO" (meaning FALSE). Similarly, the operand register 27 contains an arithmetic portion and a logic portion. The next following c.p.(a) causes the program counter 20 (FIG. 1) to select the instruction word at program instruction address 2 in the main memory 11 (FIG. 1). The operation code in the operation register 23, the operation sequence code in the operation sequence register 25 and the operand in the operand register 27 are then determined by the second program instruction word. That is, operation register 25 contains >, operation sequence register "1111" and operand register "B." Because the operation sequence code remains "1111," the next following c.p.(b) again causes execution of the operation called for by the code in the operation register 23. That is, "A" (in the accumulator 39) is compared with "B" (in the operand register 27) by appropriate logic circuits in the arithmetic and logic unit 35. The result of such comparison (whether TRUE or FALSE) is passed back to the accumulator 39 in a conventional way. It will be noted here that the mode of operation of the processor 17, when an "execute operation called for" code is in the operation sequence register 25**, corresponds substantially to the mode of operation of any conventional processor.

When the program counter 20 (FIG. 1) selects the instruction word at program address 3 in the main memory 11, the code for the operation "AND" is loaded in the operation register 23, the code 0000 is loaded in the operation sequence register 25 and the code for "C" is loaded in the operand register 27. The code 0000 in the operation sequence register 25 here indicates that sufficient information has not been received properly to effect the desired operation. It is required, therefore, that the operation (and the partial result of the already accomplished processing) be deferred. Therefore, the code 0000 in the operation sequence register 25 causes a deferred sequence decoder 41 to be actuated. The deferred sequence decoder 41 preferably is a conventional decoding matrix, similar to that used in the "no change" decoder 29, except that it is responsive to "0000" to produce a "one". It will be noted in passing here that AND gates 31, 33 (controlled by the "no change" decoder 29) are inhibited when the deferred sequence decoder 41 is actuated. Therefore, the arithmetic and logic unit 35 is effectively disconnected. Actuation of the deferred sequence decoder 41, however, enables AND gates 43, 45, 47, 49 thereby effectively connecting: (1) the present operation code in the operation register 23 to a sequence memory 51; (2) the present partial result in the accumulator 39 to the sequence memory 51; (3) the number in the operand register 27 (here "C") to the accumulator 39; and (4) c.p.(b) to the "up" terminal of a sequence memory address counter 53. Assuming the count in the sequence memory address 53 initially to be "zero," it follows then that the present operation code (from the operation register 23) and the present partial result (from the accumulator 39) are stored in the lowest, i.e. address No. 1, address in the sequence memory 51. On counting "up one" in response to the mext following c.p.(b), the sequence memory address counter 53 causes the next higher address, i.e. address No. 2, in the sequence memory 51 to be addressed.

The next following c.p.(a) causes instruction address 4 in the main memory 11 to be selected, thereby loading the operation register 23 with a code meaning "not equal"; the operation sequence register 25 with a 0000 and the operand register 27 with "D." Because the code in the operation sequence register 25 is now 0000, the deferral operation just described is repeated. In this case, however, because the sequence memory address counter 53 has selected the second address in the sequence memory 51, the operation code "not equal to" and the deferred partial result in the accumulator 39 ("C") are stored in the second address of the sequence memory 51. In addition, "D" is shifted from the operand register 27 to the accumulator 39. The next following c.p.(a) causes the program select counter 20 to select the instruction word at instruction address 5 in the main memory 11. Therefore, the code in the operation register 23 becomes "multiply," the code in the operation sequence register 25 changes to "1111" and "E" is loaded into the operand register 27. The "1111" code in the operation sequence register 25 actuates the "no change" decoder 29. As described hereinbefore, actuation of the "no change decoder" 29 in turn causes the arithmetic and logic unit 35 to process the numbers in the operand register 27 and the accumulator 39 in accordance with the present operation. The next c.p.(b), therefore, causes the product of "D" and "E" to be derived in the arithmetic and logic unit 35 and returned to the accumulator 39. On the next following c.p.(a), instruction address 6 in the main memory 11 is selected. Therefore, the code in the operation register 23 becomes "subtract," the code in the operation sequence register 25 changes to 0010 and "F" is loaded into the operand register 27. As shown in Table I, the code 0010 in the operation sequence register 25 requires that the program counter 20 (FIG. 1) be inhibited and three operations be performed before clock pulses are again applied to such counter. In the example being discussed, the three operations in order are: (1) subtract the number in the operand register 27 (here "F") from the number in the accumulator 39 (here "DE"), i.e. determine "DE -F"; (2) compare the deferred partial result (here "C") at address No. 2 of the sequence memory 51 with "DE - F"; i.e., determine whether or not $C \neq DE - F$; and (3) retrieve the first deferred operation code (here "AND") and the partial result deferred along with such operation code (here the result of comparing "A" and "B") and comparing such partial result with the partial result obtained in (2) above, finally to produce either a TRUE indication of a FALSE indication in the accumulator 39. The TRUE indication, which is a "ONE" in the logic portion of both the accumulator 39 and the operand register 27, enables the transfer unit 22 (FIG. 1) to accept the contents (here "10") of the operand address field of the word in the instruction register 21. The program counter 20 is, therefore, forced to change its count to "10," meaning that instruction words "8" and "9" are skipped and the instruction word at address No. 10 in the main memory 11 is used to control the next cycle of operation of the computer.

The elements in FIG. 2 now to be discussed effect the required sequential operations when two deferred operations are retrieved. It will become clear, however, that any number (up to 14) of operations may be deferred and then sequentially retrieved from the sequence memory 51. With the code 0010 in the operation sequence register 25, a retrieve deferred sequence decoder 55 is actuated to enable AND gates 57, 59. When the former gate is enabled, the operation code (here SUBTRACT) in the operation register 23 is impressed on the arithmetic and logic unit 35. The latter gate, when enabled, allows the next c.p.(b) to be applied to AND gates 37*a*, 37*b*, 37*c* and to the arithmetic and logic unit 35. Therefore, the first required operation, i.e., subtracting "F" from "DE" is executed and the result, "DE - F," is placed in the accumulator 39. Actuation of the retrieve deferred sequence decoder 55 also enables AND gate 61, thereby allowing the retrieve code, here 0010, to be passed through a normally enabled AND gate 63 to a retrieval counter 65. When the latter is so loaded, a "NOT ZERO" decoder 67 is actuated to reset a normally set flip flop 69 thereby to inhibit AND gate 63. The retrieval counter 65 is therefore loaded with "0010" and isolated from the operation sequence register 25. The resetting of flip flop 69 also causes AND gate 19 (FIG. 1) to be inhibited, thereby preventing the program counter 20 from being incremented until after the retrieval and execution of the last two deferred operations. The actuation of the retrieve deferred sequence decoder 55 also enables AND gates 71 and 73. The latter gate, when enabled, permits each following c.p.(b) to decrement the sequence memory address counter 53 by one. The former gate when enabled permits both c.p.(a) and c.p.(b) to be impressed on a delay counter 75 (which is filled after it receives two pulses). An AND gate 77 is enabled when the delay counter 75 is filled. Thus, as may be seen, the next following c.p.(a) on AND gate 77 (after such gate is enabled) is effective: (1) to enable AND gate 79, thereby to impress the last deferred operation code, i.e., ≠ at address No. 2 in the sequence memory 51, on the operation register 25; (2) to enable AND gate 81, thereby to impress the last deferred partial result, i.e. C at address No. 2 in the sequence memory 51, on the accumulator 39; (3) to enable AND gate 83, thereby to shift the partial result (here DE − F) from the accumulator 39 to the operand register 27; and (4) decrement the retrieval counter by "one." With AND gates 57, 59 still enabled, the next following c.p.(b) then is effective to cause the arithmetic and logic unit 35 to execute the comparison C ≠ DE − F, thereby loading the logic portion of the accumulator 39 with a "ONE" or a "ZERO." The next following c.p.(a) and c.p.(b) cause repetition of the just described retrieval and execution steps in this case, retrieving the operation code "AND" and the partial result "A > B" and shifting the result of the C and "DE − F" from the logic portion of the accumulator 39 to the logic portion of the operand register 27. Therefore, upon execution of the operation "AND," the accumulator 39 contains either a TRUE or a FALSE indication. Having been decremented by two, the retrieval counter 65 and the sequence memory address counter 53 are now both empty. The accumulator 39 now contains a TRUE indication if the conditions A > B and C ≠ DE − F are both true, otherwise the accumulator 39 contains a FALSE indication. A zero detector 85, responsive to the empty condition of the retrieval counter 65, then causes *f/f* 69 to be "set" and the delay counter 75 to be "reset." The setting of *f/f* 69 in turn enables AND gate 19 (FIG. 1). At the same time, the sequence memory address counter 53 having also gone to "zero," a zero detector 87 is actuated to reset the operation sequence register 25 (meaning to place therein the code 1111) and to enable an AND gate 89 to connect the accumulator 39 with the transfer unit 22 (FIG. 1). If the partial result in the accumulator is then TRUE, a logic "one" is passed to the transfer unit 22. If the partial result is then FALSE, a logic "zero" is passed to the transfer unit 22.

The transfer unit may, in its simplest form, here include a matrix of AND gates (not shown), each one of such gates connecting a digit in the operand address field of the instruction register 21 and a corresponding digit in the program counter and being enabled by AND gate 89 (FIG. 2). Thus, if the partial result is TRUE, the count in the program counter 20 may be forced from its normal count (here 7) to 10. On the other hand, if the partial result is FALSE, no such forcing occurs. Therefore, on the occurrence of the next following c.p.(a), the program counter 20 will be caused to count up from 10 or from 6. In other words, the appropriate part of the latter portion of the sequence (GO TO M OR ELSE CONTINUE) is effected.

Figure 3A:
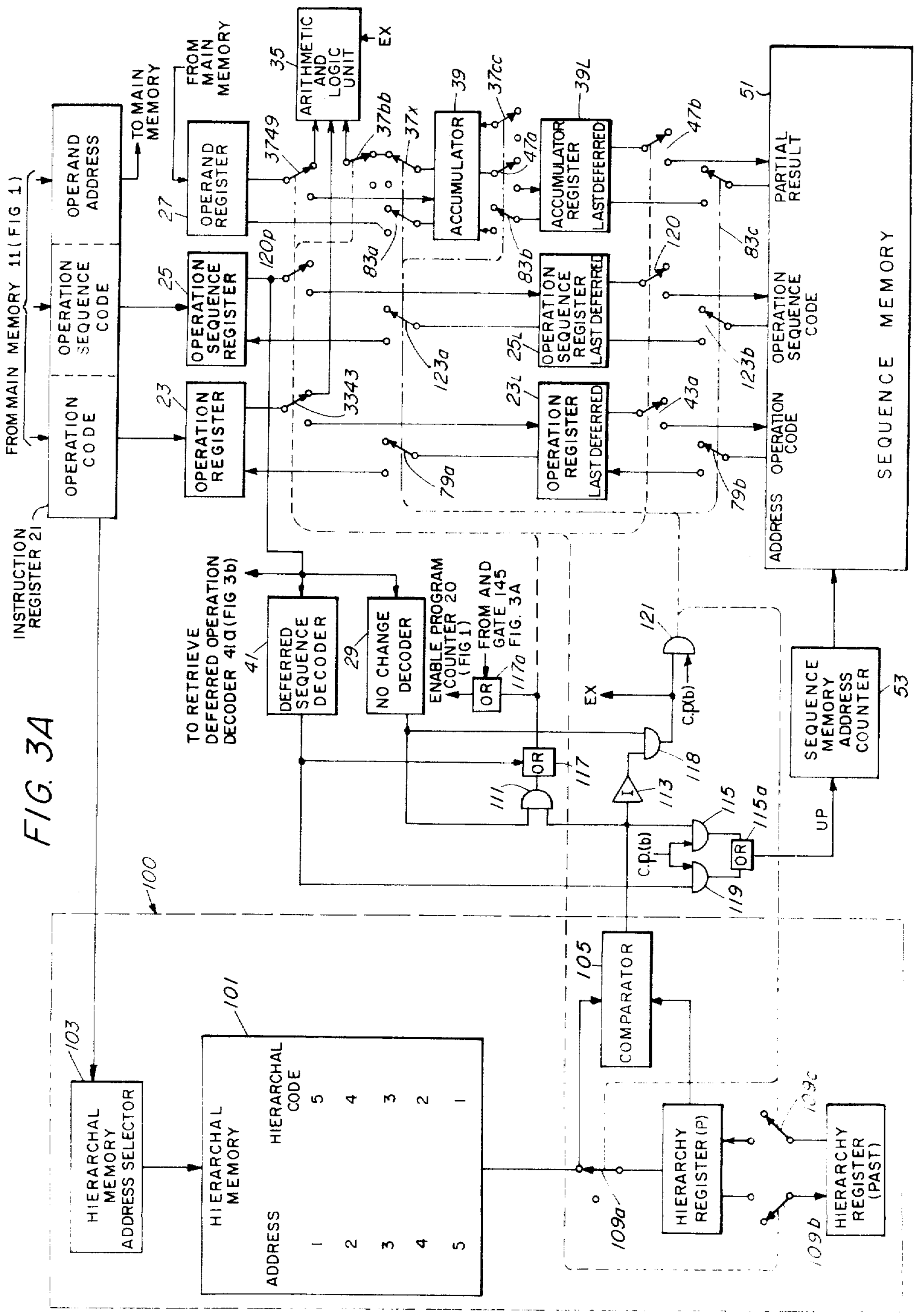
FIGS. 3A and 3B taken together are a simplified block diagram showing how the processor of FIG. 2 may be modified so that, in addition to "left to right" precedence, a hierarchal precedence notation may be used in the processing of any given sequence.
Figure 3B:
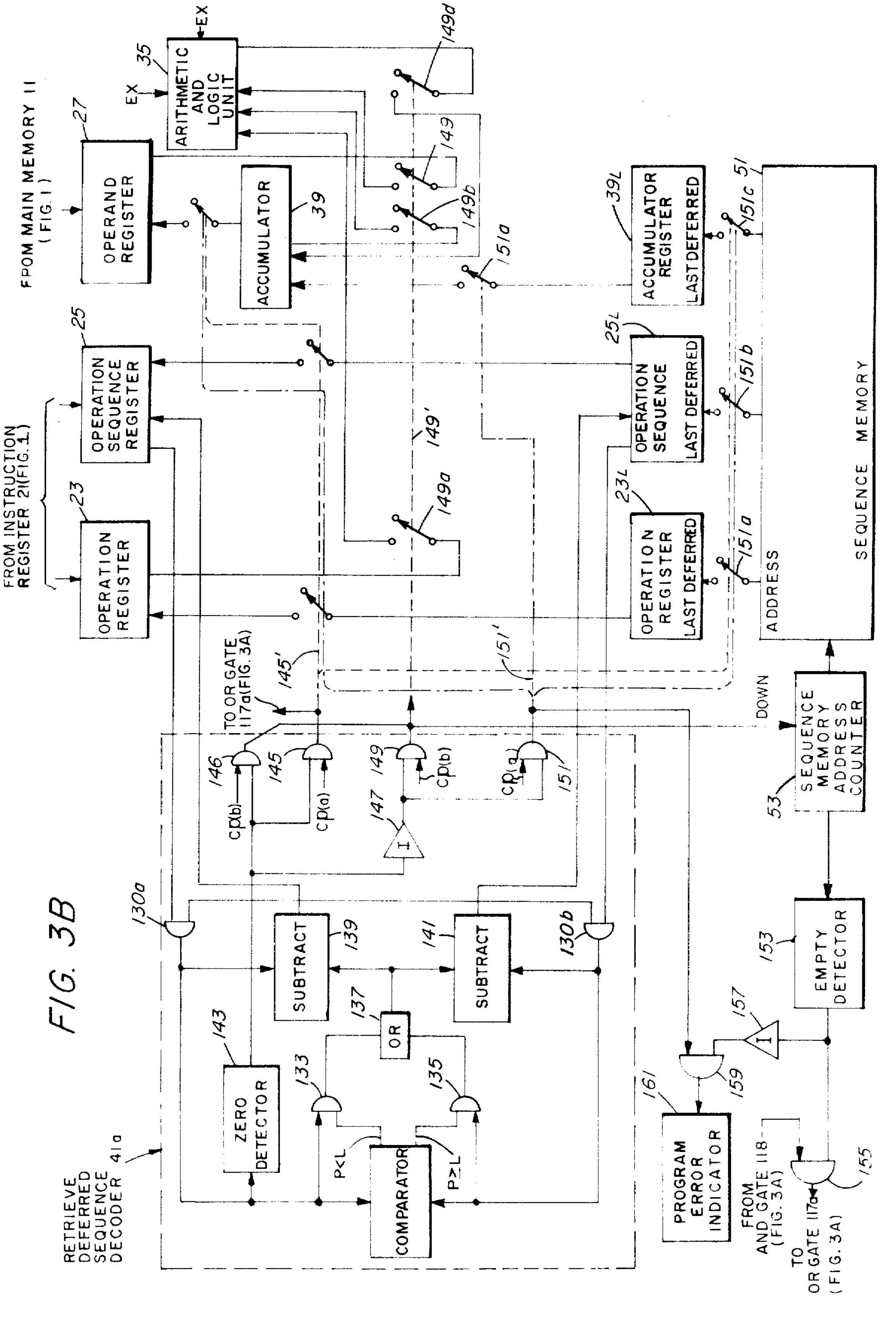

The processor 17 shown in FIG. 2 follows the rules dictated by an assumed "left to right" precedence notation. Therefore, with such a processor, parentheses must, whenever an operation which must be deferred for any reason is encountered, be written explicitly. With the widely used "scientific" precedence notation (wherein certain operations take precedence over other operations) it is necessary to use "explicit" parentheses only when the sequence being processed requires deferral of an operation until sufficient information is received to accomplish a given operation. To put it another way, with scientific notation an explicit parenthesis (meaning to defer execution of an operation) is required when the normal precedence rules between operations are not to be followed. In the absence of an explicit parenthesis between operations, the precedence — hereinafter referred to as the hierarchal precedence — of two successive operations determines which of the two must be first executed. If then the hierarchal precedence of an operation requires that it be deferred until after the next following operation is executed, the sequence may be considered to contain an implicit parenthesis between the two. The determination of the hierarchal precedence of two successive operations may be accomplished in different ways. For example, a part of each operation code could be reserved for a code indicative of the hierarchal precedence of each operation. Then a simple comparison of such reserved parts in successive operation codes would suffice to determine hierarchal precedence. Alternatively, the operation codes themselves could be ranked before the computer is programmed. Both such approaches, however, have obvious shortcomings in that the former limits the number of operations possible with an operation code of a given length and the latter cannot distinguish between the hierarchal precedence of operations having the same rank. Therefore, it is preferable to provide (by elements to be described hereinafter) means for comparing the hierarchal precedence of successive operation codes, such means producing a signal, say a logic "ONE," when the result of such comparison requires that the second operation be executed before the first operation. To complete processing of a sequence expressed in scientific precedence notation it is necessary to "balance" explicit opening and closing parentheses. While such a balancing procedure is being carried out, it is quite likely that implicit parenthetical statements may have to be processed. Further, it is possible that there be a greater number of explicit opening parentheses in the portion of any sequence being processed than the number of closing parentheses or that there be one or more implicit close parentheses along with explicit closed parentheses. Any processor or method of processing must, therefore, be adapted to "balance" opening and closing parentheses regardless of the particular combination of explicit and implicit parentheses in a sequence. With the foregoing in mind, it will be observed that the processor shown in FIGS. 3A and 3B is capable of processing the statements in a sequence expressed in a scientific precedence notation. Before going into detail, it should be noted that FIG. 3A shows the logic required to execute an operation in the absence of either explicit or implicit parentheses or to defer execution of an operation because of the presence of either explicit or implicit parentheses. FIG. 3B illustrates the logic for retrieving the deferred portions of a sequence being processed when an explicit close parenthesis (or more than one) is encountered in the sequence. For this reason, it will be obvious that many elements (such as the various registers, the arithmetic and logic unit, the accumulator and sequence memory) are duplicated in FIGS. 3A and 3B. Obviously, however, such duplicated elements in a practical embodiment of this invention are not different elements. It should also be noted that many of the switching elements in the two figures, represented for convenience of explanation as mechanical switches are in fact electronic switching elements in a practical embodiment.

It should also be noted that the sequence (in scientific notation):

A + B * (C − D * E) END has been chosen to illustrate the manner in which the processor shown in FIGS. 3A and 3B operates. The program for processing such a sequence is:

| Operation Code | Operation Sequence Code | Operand Code |
|---|---|---|
| LOAD | 0000 | A |
| ADD | 0000 | B |
| MULT | 0001 | C |
| ADD | 0000 | D |
| MULT | 1001 | E |
| END | 0000 | NONE |

It is noted here that a four bit operation sequence code has been arbitrarily adopted for expository reasons. Thus: 0000 represents "no change," meaning no explicit parenthesis; any code with a "0" in the most significant bit represents explicit open parentheses, the last three bits being the number thereof; and any code with a "1" in its most significant bit represents explicit close parentheses, the last three bits being the number thereof.

The hierarchal precedence for the various operations encountered in the processing of such sequence in descending order is

HIERARCHAL PRECEDENCE

| | |
|---|---|
| LOAD | 4 |
| MULT | 3 |
| ADD | 2 |
| SUBT | 2 |
| END | 1 |

Such a precedence means that the operations called for by LOAD operation (meaning to start the processing) takes precedence over a MULTIPLY operation; MULTIPLY takes precedence over ADD or SUBTRACT; and, ADD and SUBTRACT have equal precedence. It is noted here that, in a practical computer, many more operations would be ranked according to precedence. To deviate from such precedence explicit parentheses according to the following code may be used.

PARENTHESIS CODE

| | |
|---|---|
| x000 | means no explicit parenthesis |
| 0XXX(=N) | means open N explicit parentheses |
| 1XXX(=N) | means close N explicit parentheses |

where X is either 1 or 0

Referring now to FIG. 3A it may be seen that the portion of the processor responsive to opening parentheses (whether explicit or implicit) included a hierarchal precedence detector 100. Such detector first compares the precedence of an operation to be performed, (sometimes referred to as the "present" operation) with the precedence of the operation next to be performed (sometimes referred to as the "future" operation) and then, if there is no explicit opening parenthesis, produces an implicit opening parenthesis signal when the precedence of the present operation is less than the precedence of the future operation (when required.) The hierarchal precedence detector 100 is enabled by means (not shown) whenever the program counter 20 (FIG. 1) is actuated. A hierarchal memory 101 (having any given number of hierarchal precedence codes stored at predetermined addresses therein) is included in such detector. The hierarchal memory 101 is preferably a read only memory of conventional construction. The particular address selected in the hierarchal memory 101 is determined by a hierarchal memory address selector 103. Such element may conveniently be a conventional register whose stages are set to correspond with the operation code in the instruction register 21 when the program counter 20 (FIG. 1) is actuated. The operation code in the hierarchal memory address selector 103 is sometimes referred to hereinafter as the "future" operational code, meaning that it represents the operation in the next instruction word following the operation called for by the operation code in the operation register 23. The selected hierarchal precedence code out of the hierarchal memory 101 is passed to a comparator 105 and to a hierarchy register (P) 107 through switching means 109*a*. The output of such register is led to the comparator 105 and, through switching means 109*b*, to a hierarchy register (past) 110. It may be seen, therefore, that the hierarchal precedence code in the hierarchy register (P) 107 sometimes referred to hereinafter as the "present" hierarchal precedence code) corresponds with the precedence of the operation in the operation register 23 and that the hierarchal precedence code in the hierarchy register (past) 110 and sometimes referred to hereinafter as the "past" hierarchal precedence code corresponds with the precedence of the operation in the operation register (last deferred) 23L. It follows that the state of the comparator 105 is indicative of the relative precedence of the operation code in the operation register 23 and the operation code in the instruction register 21. Here the state of the comparator 105 is such that a logic ONE is produced when the precedence of the code in the hierarchy register (P) 107 is equal to or less than the hierarchal precedence of the operation code in the instruction register 21 and a logic ZERO is produced otherwise. The output of the comparator 105 is applied to an AND gate 111, an inverter 113 and an AND gate 115.

The operation sequence code in the operation sequence register 25 is applied to a "no change" decoder 29, a deferred sequence decoder 41 and to a retrieve deferred sequence decoder 41*a*. The first two decoders may be identical to the decoder hereinbefore discussed in connection with FIG. 2, while the latter will be discussed in detail hereinafter in connection with FIG. 3B.

Assuming that the operation sequence code in the operation sequence register 25 is X000 (meaning that there are no explicit parentheses), then the "no change" decoder 29 is actuated to enable AND gate 111. Assuming also a logic ONE out of the comparator 105, such a level is passed through AND gate 111 and OR gate 117 to actuate switching means, not shown for clarity. Such means actuate, as shown by the dashed line, a number of switches 3343, 3749, 120, 120P, 37*bb*, 43*a*, 118 and 47*b*. It will be observed that actuation of these switches prevents execution of the present operation and causes the present instruction word (including the operation sequence code) to be "pushed" respectively into the operation register (last deferred) 25L and the accumulator 39. The contents of the accumulator 39, the operation register (last deferred), 23L, the operation sequence register (last deferred 25L and the accumulator 39 are also "pushed." That is, the contents of the registers 23L and 25L are pushed into the sequence memory 51 while the contents of the accumulator 39 are pushed into the accumulator register (last deferred) 39L. It will be evident therefore that a logic ONE out of the comparator 105 (meaning that an implicit parenthesis has been encountered by the hierarchal precedence detector 100) causes the processor to "defer" execution of a present operation in substantially th same manner as a single explicit open parenthesis would cause deferral in the processor shown in FIG. 2. It is noted here, however, that the operation sequence code X000 (indicating here an implicit opening parenthesis) is stored in the operation sequence register (last deferred) 25L and that the present hierarchy precedence code in hierarchy register (P) 107 is stored in the hierarchy register (past) 109*b* as with an explicit opening parenthesis in FIG. 2, the sequence memory address counter 53 in this instance is stepped up one by c.p. (b) passing through the AND gate 115. At the same time, OR gate 117*a* passes an enabling signal to the program counter 20 (FIG. 1).

If the output of the comparator 105 is a logic ZERO, then AND gates 111 and 115 are inhibited so that the "pushing" just described does not occur. The inverter 113, however, changes such logic ZERO to a logic ONE on AND gate 118. That gate being enabled by the "no change" decoder, then passes an "execute" present operation signal to the arithmetic and logic unit 35 and enables AND gate 121. The next following c.p.(b), therefore, actuates switching means (not shown for clarity) to causes switches 79*a*, 123*a*, 83*a*, 79*b*, 123*b*, 83*b*, 83*c* and 109*c* to operate. As may be seen, the result of operation of such switches is to "pop" each past (or deferred) operation back to its immediately prior stage. In particular, the operation code in the operation register (last deferred) 23L is loaded into the now empty operation register 23 and the corresponding hierarchal code in the hierarchal register (past) 107*a* is loaded into the hierarchal register 107. Therefore, the processor is in condition to compare the hierarchal precedence of the future operation code (now in the instruction register 21) with the hierarchal precedence of the last deferred past operation (now in the operation register 23). Such comparison, as just described in connection with the execution or deferral of a present operation, results either in an execute signal (out of AND gate 118) or a defer signal (out of OR gate 117).

The presence of an operation sequence code representing one or more explicit opening parentheses in the operation sequence register 25 causes the deferred sequence decoder 41 to produce a logic ONE. Such signal is applied to OR gate 117 to effect "pushing" as described hereinbefore. The presence of a logic ONE at the output of the deferred sequence decoder 41 also enables an AND gate 119 to cause the sequence memory address counter 53 to be incremented by a count of "one" by c.p.(b). It follows, then, that the presence of a code representative of one or more explicit opening parentheses, causes the processor here to operate in the same manner as described for an implicit opening parenthesis, except in this case an opening parenthesis code (not X000) is loaded into the operation sequence register (last deferred) 25L for reasons which will become clear hereinafter.

Referring now to FIG. 3B it may be seen that the retrieve deferred sequence decoder 41*a* is responsive to an explicit closing parenthesis code, 1XXX, (representing one or more closing parentheses) in the operation sequence register 25 and the last deferred operation sequence code. The last deferred sequence code must either be 0000 (representing an implicit opening parenthesis) or 0XXX (representing one or more explicit opening parentheses). The last three digits of the two operation sequence codes are applied to a comparator 131 when AND gates 130*a*, 130*b* are enabled. Such element produces a logic ONE on one output line when the number of explicit close parentheses in the operation sequence register 25 is less than the number of the last deferred opening parentheses and a logic ONE on a second output line when the former is greater than, or equal to, the latter. That is, either AND gate 133 or AND gate 135 is enabled, depending upon the relative number of explicit opening and closing parentheses. Thus, either the number of explicit closing parentheses in the operation sequence register 25 or the number of explicit opening parentheses in the operation sequence register (last deferred) 25L, is passed through an OR gate 137 to a pair of subtracting circuits 139, 141. The second input to the subtracting circuit 139 is the last three bits (binary digits) in the operation sequence register 25 and the second input to the subtracting circuit 141 is the last three bits in the operation sequence register (last deferred) 25L. The outputs of the subtracting circuits 139, 141 are passed respectively to the operation sequence register 25 and the operation sequence register (last deferred) 25L as shown. It follows, therefore, that the number indicating explicit parentheses in the two registers is reduced by an amount equal to the smaller of the two numbers present originally in the two registers. When an implicit opening parenthesis, i.e. 0000, is initially present in the operation sequence register (last deferred) 25L, "zero" is subtracted, so no change takes place in the operation sequence register 25. A zero detector 143 is connected to the last three digits of the operation sequence register 25 as shown. When such digits are a code representing one or more explicit close parentheses the zero detector 143 produces a logic ZERO output. As a result, an AND gate 145 is inhibited and an inverter 147 produces a logic ONE. AND gates 149, 151 are therefore enables. AND gate 149 is then in condition to pass c.p.(b), thereby to actuate the switching means (not shown for clarity) to actuate, as shown by the dashed line 149, switches 149*a*, 149*b*, 149*c*, 149*d*. It will be observed that switching means 149' connects the operation register (last deferred) 23L, the accumulator register 39 and the register (last deferred) 39L to the arithmetic and logic unit 35. In other words, the accumulator 39 takes the place of the operand register 27 and the accumulator register (last deferred) 39L takes the place of the accumulator 39 so that an operation may be executed. Therefore, on the next c.p.(b), the last deferred operation is executed (the result thereof being loaded into the accumulator register (last deferred) 39L) and the sequence memory address counter 53 is counted down by one. The next following c.p.(a) passes through the enabled AND gate 151 to enable switching means (not shown) to actuate switches 151a, 151*b*, 151*c*, 151*d* as shown to connect: (a) the accumulator register (last deferred) 39L, to the accumulator 39; (b) the operation code, the operation sequence code and the partial result at the address determined by the sequence memory address counter 53 in the sequence memory 51 to, respectively, the operation register (last deferred) 23L, the operation sequence register (last deferred) 25L and the accumulator register (last deferred) 39L.

With a new deferred operation sequence code in the operation sequence register (last deferred) 25L, the retrieve deferred sequence decoder 41*a* then recycles until the operation sequence code in the operation sequence register 25 is reduced to zero. The switching means 149′ and 151′ are recycled each time the retrieve deferred sequence decoder 41*a* is recycled. When the output of the zero detector 143 is a logic one AND gate 145 is enabled thereby to permit switching means 145′ to be actuated. Actuation of switching means 145′ then connects the operation sequence register (last deferred) 25L, to the operation sequence register 25, thereby placing the code 000 in the latter. At the same time the contents of the operation register last deferred, 23L, are placed in the operation register 23 and the contents of the accumulator 39 are placed in the operand register 27 and the contents of the accumulator register (last deferred) 39L are placed in the accumulator 39. In other words, the operation register 23, the operation sequence register 25, the operand register 27 and the accumulator 39 are placed in the same condition as if a no change in sequence coding had been loaded into the operation sequence register 25 from the instruction register 21 (FIG. 1). The processor then is in condition to operate further by determining whether or not a hierarchal precedence deferral is required as shown and discussed in connection with FIG. 3A.

During the time in which the deferred operations were being retrieved, an empty detector 153 connected to the sequence memory address counter 53 produces a logic zero. When the retrieve operation is completed then empty detector 153 produces a logic one. Such signal then enables an AND gate 155 to permit an "operation complete" signal from AND gate — (FIG. 3A) to be passed to OR gate — (FIG. 3A). The program counter is therefore enabled to continue to extract instruction words out of the main memory 11 (FIG. 1) in proper order. The signal out of the empty detector 153 is passed through a converter 157 to enable an AND gate 159. The second signal on the AND gate 159 is the signal out of AND gate 145. AND gate 159 in turn is connected to a program error indicator 161.

Having described the elements needed to process a sequence in scientific precedence notation, it will now be shown how the exemplary sequence is processed. It is assumed here that all registers are empty, meaning all contain ZERO. Thus, the first instruction word (LOAD: ADDRESS A", with the code 0000 in its operation sequence field) out of the main memory 11 (FIG. 1) is loaded into the instruction register 21. The operation code field, i.e. "LOAD," in such word is passed to the hierarchal precedence selector 100, thereby causing hierarchal code "4" to be impressed on the comparator 105 as the future hierarchal precedence code. That comparator, because the present operation (P) code in the hierarchy register (P)107 is smaller, produces a logic ONE. At the same time the "no change" decoder 29 is actuated by reason of the ZERO code in the operation sequence register 25. A "defer" signal is, therefore, present at the output of OR gate 117 to cause the contents of the operation register 23, the operation sequence register 25, the operand register 27 and the hierarchy register 107 to be "pushed" into the corresponding deferral registers (or the accumulator). That is, the arithmetic and logic unit 35 is bypassed and the registers in the processor remain empty. At the same time the program counter (FIG. 1) is enabled: (a) to shift the operation code (LOAD) and the operation sequence code (0000) in the first instruction word to the operation register 23 and the operation sequence register 25; (b) to load the operand register 27 with "A" from the main memory; and (c) to transfer the second instruction word (ADD; address B, with the code 0000 in its operation sequence field) from the main memory to the instruction register 21. The hierarchal code "4" is then in the hierarchy register (P)107. At this time, the operation code "ADD" causes the hierarchal code "2" to be extracted from the hierarchal memory 101 and impressed on the comparator 105. The latter element again produces a logic "ZERO." The 0000 code in the operation sequence register 25 actuates the "no change" decoder 29 so that the next following "execute" signal causes the "LOAD" operation to be performed. "A" is, therefore, transferred from the operand register 27 to the accumulator 39. Upon completion of the operation, AND gate 121 being enabled, the contents (ZERO) of operation register (last deferred) 23L are returned to the operation register 23, the contents (0000) of operation sequence register (last deferred) 25L are returned to the operation sequence register 25, the contents ("A") of accumulator 39 are returned to the operand register 27 and the contents of hierarchy register (deferred) 107*a* are returned to hierarchy register (P)107. The comparator 105 therefore produces a logic ONE which in turn causes a "defer" signal to be present at OR gate 117, again to "push" the contents of the various registers and to enable the program counter (FIG. 1). Before the program counter is enabled, then, all registers (except the hierarchy register (P)107 which contains the hierarchal code "2" are empty but A is loaded in the accumulator 39. The effect of operation of the program counter, therefore, is: (a) to shift the operation code and operation sequence code in the second instruction word from the instruction register 21; (b) load the operand register 27 with the operand ("B") at the operand address in the main memory determined by the operand address code in the second instruction word; and (c) load the instruction register 21 with the third instruction word MULTIPLY ADDRESS C (with 0001 in the operation sequence field).

With 0000 now in the operation sequence register 25, an ADD code in the operation register 23 and a MULTIPLY code in the instruction register 21, the hierarchal precedence detector 100 produces a "defer" signal at OR gate 117. The "defer" process described above takes place again with the result that: (a) the ADD code is shifted to the operation register (last deferred); (b) the operation sequence code 0000 is shifted to the operation sequence register (last deferred) 25L; (c) the operand "B" is shifted to the accumulator 39; (d) the partial result "A" is shifted to the accumulator register (last deferred) 39L; (e) hierarchal code "2" is shifted to the hierarchal register (deferred) 107*a;* and (f) the sequence memory address counter 53 is incremented.

The next transfer signal then causes the instruction register 21 to be loaded with the fourth instruction word (ADD "D" with 0000 in the operation sequence field) and the operation register 23 to be loaded with the code MULTIPLY; the operation sequence register 25 to be loaded with 0001 (meaning one opening parenthesis); and the operand register 27 to be loaded with "C." The sequence code 0001 in the operation sequence register 25 actuates the retrieve deferred sequence decoder 41*a* rather than the "no change" decoder 29. The operation of the hierarchy precedence detector 100 is, therefore, without effect. A "defer" operation described above takes place, however, by reason of the actuation of the deferred sequence decoder 41*a*. The result of this "defer" operation is to "push" the contents of the registers and the accumulator in the processor down one rank (transferring the contents of the "last deferred" registers to the sequence memory 51).

The fourth instruction word (ADD "D" with 0000 in the operation sequence field) is then transferred and the fifth instruction word (MULTIPLY ADDRESS E with the operation sequence code 1001) is loaded into the instruction register 21. The hierarchal code "3" is then in the hierarchal register 107 so the output of comparator 105 is a logic ONE. The sequence code 0000 in the operation sequence register 23 then actuates the "no change" decoder 29 to enable AND gates 111 and 115.

As before, when AND gates 111 and 115 are enabled, the contents of all registers and the accumulator are deferred and the next following (here the sixth) instruction word (END "ZERO" with 0000 in its operation sequence field) is loaded into the instruction register 21.

The presence of the closing parenthesis (operation sequence code 1001) in the operation sequence register 25 causes the retrieve deferred sequence decoder 41*a* (FIG. 3B) to be actuated. Therefore, operation of the hierarchal sequence detector 100 is ineffective. The contents of the various registers in the processor, the accumulator and the sequence memory at this time are:

| | |
|---|---|
| Operation Register 23 | MULTIPLY |
| Operation Sequence Register 25 | 1001 |
| Operand Register 27 | E |
| Accumulator | D |
| Operation Register (last deferred) 23L | ADD |
| Operation Sequence Register (last deferred) 25L | 0000 |
| Accumulator Register (last deferred) 39L | C |
| Sequence Memory (address 1) | MULT; 0001; B |
| Sequence Memory (address 2) | ADD; 0000; A |

It will be observed that the processor, before having received the END processing operation code, has rearranged the original sequence to eliminate all implicit parentheses. That is, the exemplary sequence:

A + B * (C + D * E) has been rearranged to become:

) D * E + C (* B + A

Therfore, to complete the processing, it is necessary only to observe the well known rule of evaluating the terms within explicit parentheses (whenver they occur) while following a left-to-right precedence.

With the foregoing in mind, the processing of the rearranged sequence proceeds in the manner now to be described, it also being remembered that the 1001 code in the operation sequence register 23 actuates the retrieve deferred operation decoder 41. Thus, the last three bits of the "0000" code (which now may be conveniently taken to mean "there is no explicit opening parenthesis following") in the operation sequence register 25L is impressed on the comparator 131 in the retrieve deferred operation decoder 41*a* along with the last three bits of the 1001 code in the operation sequence register 25. The result, therefore, is that the codes in the two registers remain unchanged and AND gates 149, 151 are enabled. The next following c.p.(b) causes the multiplication of "D" and "E" to be effected (by actuating switches 149*a* through d), the partial result "D * E" to be loaded into the accumulator 39 and the sequence memory address counter 53 to decrement by one. The next following c.p.(a) causes "ADD 0001 C" to be transferred from the sequence memory 51.

The last three bits (now 001 meaning that there is an explicit opening parenthesis following) of the sequence code now in the operation sequence register (last deferred) 25L is impressed on the comparator 131. The result is that "001" is subtracted from the code in both operation sequence registers 25, 25L. The zero detector 143 (which responds to the last three bits in the sequence code in the operation sequence register 25) changes its state, thereby disabling AND gates 149, 151 and enabling AND gates 145, 146. Consequently, the operation "ADD" is moved from the operation register (last deferred) 23L to the operation register 23, the partial product "D * E" is transferred to the operand register 27 and "C" is transferred to the accumulator 39. The processor then responds as though a "0000" operation sequence code had been loaded into the operation register 25 from the instruction register 21. That is, the hierarchal precedence detector 100 now becomes operative. However, the "END" code in the instruction register 21 (converted to a "1" hierarchal code) has a lower hierarchal precedence than "ADD" (hierarchal procedence "2"). Consequently, the "ADD" operation is effected and the sequence memory address counter 53 is again decremented through AND gate 146. The next following c.p.(a), on passing through AND gate 145, causes the partial product D * E + C to be shifted to the operand register 27 and MULTIPLY "B" to be shifted, respectively, to the operation register 25 and the accumulator 39 and ADD 0000 "A" to be shifted from the sequence memory 51 to, respectively, the operation register (last deferred) 23L, the operation sequence register (last deferred) 25L and the accumulator register (last deferred) 39L. Again "MULTIPLY" taking precedence over "END," the operation is executed and the sequence address memory 53 is decremented. The partial result in the accumulator 39 then is ( D E + C) * B. The next c.p.(a) passing through AND gate 145 now causes ADD "A" to be retrieved and the memory address counter 53 again to be decremented. Again, "ADD" takes precedence over "END" so the result (D * E + C) * B + A is stored in the accumulator 39.

With AND gate 145 still enabled, the retrieval operation is again executed. The operation code in the operation register becomes zero and the sequence memory address counter 53 becomes empty. Therefore, emply detector 153 enables AND gate 155 and through inverter 157 inhibits AND gate 159. The processor now is in a condition coresponding to its condition when the processing was begun, i.e., when the first instruction word was loaded into the instruction register 21. The code "END" is, therefore, shifted to the operation register 23 and executed as described hereinbefore. The "1" in the most significant place of the code in the operation sequence register 25 is now changed to a "0." Therefore, the "no change" decoder 29 (FIG. 3A) is actuated as described herebefore the enable AND gate 118. The "execute" control signal out of AND gate 118 then may pass through AND gate 155 back through OR gate 117*a* (FIG. 3*a*) to enable the program counter 20 (FIG. 1). If, at this time the sequence memory address counter 53 is empty but there is still an explicit closing parenthesis code in the operation sequence register 25, a program error indicator 161 is actuated by a signal passing through AND gate 159. This indicates that a larger number of explicit opening parentheses than of explicit closing parentheses were written in the original program.

The concepts of this invention may be applied to types of notation other than those discussed. For example, the sequence (in left to right precedence notation)

A + (B * C + (D * E + F * (G + H)) * J could be expressed as

A + (B * C + (D * E + F * (G + H) * J)
M

The precedence notation in the equivalent sequence is also left to right modified to contain, at any point therein, a single explicit closing parenthesis. The equivalent sequence may be processed using a two bit operation sequence code to conserve space in the field of each instruction word for other necessary or desirable codes, as operation or operand address codes. To process such a sequence an operation sequence (or parenthetical) code which differs from any code heretofore used is required. The required operation sequence code is:

00 means no parenthesis
01 means unmarked begin parenthesis
10 means marked begin parenthesis
11 means close parenthesis A moment's thought will make it clear that the code "00" corresponds to the no change in sequence code "X000" used in the processor shown in FIGS. 3A and 3B; the code "01" corresponds to the defer operation (explicit opening parenthesis) code "OXXX"; the code "10" corresponds to an implicit parenthesis determined by operation of the hierarchal precedence detector; and the "11" code corresponds to the retrieve deferred operation (explicit closing parenthesis) code "1111." It follows then that the processor shown in FIGS. 3A and 3B may easily be modified by replacing the hierarchal precedence detector 100 with a decoder responsive to the "10" code and by modifying the retrieve deferred operation decoder 41*a* so that it "counts down" only in response to the "01" code. During operation of such a modified processor either one of the "begin parenthesis" codes would cause deferral. During return of deferred operations when a "close parenthesis" code is encountered, each retrieved begin parenthesis code "10" would be the equivalent of an implicit opening parenthesis so that the retrieval process would continue until an unmarked opening parenthesis code is retrieved.

It will be obvious to one of skill in the art that many changes in the disclosed embodiments may be made without departing from the concepts of this invention. For example, although only two interlaced trains of clock pulses have been used in the explanation of the operation of a computer according to the invention, it will be obvious that more than two interlaced trains may sometimes be desirable in order to optimize performance. Further, and more generally, the idea of using a deferral, or parenthetical, field in an instruction word along with other fields (as an operation and an operand address field), a sequence memory and control circuits therefor in the processor means that the syntax of machine language may be made to correspond more closely with the syntax of any source language. Specifically punctuation may be introduced into machine language to improve overall efficiency of operation by eliminating the need for software, as a compiler with a memory large enough to store any program, to rearrange the order of instruction words. Further, the concept of introducing "punctuation" in the syntax of machine language makes it easier to write programs which may be executed by the computer in a minimum length of time with a minimum amount of memory. Still further, it will be evident that the concepts of this invention are applicable regardless of the precedence rules of the source language, provided only that there are differences in precedence in the syntax of such language. It is felt therefore that this invention should not be restricted to its disclosed embodiments but rather should be limited only by the spirit and scope of the appended claims.

What is claimed is:

1. In a pipeline digital computer wherein a first sequence of instruction words is converted, during execution of the program defined by such first sequence, to a second sequence of operation and operand code signals, each one of the instruction words being stored at a known address in a main memory and retrieved therefrom in an order determined by a program counter to load an operation register, an operand register and an operation sequence register, the last-named register containing a machine readable code indicative of the order in which the second sequence of operation and operand code signals are to be applied to a processor having an accumulator for partial products, the improvement comprising:

a. decoding means, responsive to the machine readable code in the operation sequence register, for producing a sequence control signal corresponding to such code;
b. auxiliary memory means for storing operation and operand code signals and partial products produced by the processor during execution of the program until such signals and products are required in the second sequence; and
c. switching means, responsive to each sequence control signal and in circuit with the decoding means, the processor, the program counter and the auxiliary memory, alternatively to:
 i. apply the then existing operation and the operand code signals to the processor;
 ii. store the then existing operation code signals and partial product in the auxiliary memory and transfer the then existing operand control signals to the accumulator; or iii. retrieve operation code signals and partial products from the auxiliary memory, apply such signals and products to the processor and inhibit operation of the program counter during such retrieval and application.

2. The improvement as in claim 1 having, additionally:

a. register means disposed between the main memory and the operation register, such means being loaded with the operation code of the next following instruction word in the first sequence; and, b. hierarchal detecting means, responsive to the operation codes in the register means and the operation register, for producing a sequence control signal.

* * * * *